2,989,554
MANUFACTURE OF VINYL ESTERS

John Edwin Oakley Mayne, Henry Warson, and Robert John Parsons, Carshalton, England, assignors to Vinyl Products Limited, Carshalton, England, a British company
No Drawing. Filed Jan. 24, 1958, Ser. No. 710,857
Claims priority, application Great Britain Jan. 30, 1957
10 Claims. (Cl. 260—410.9)

This invention is for improvements in or relating to the manufacture of vinyl esters and has for an object to provide an economical process for the recovery of vinyl esters of higher fatty acids which have been prepared by an ester-acid interchange reaction.

It is known that an ester-acid interchange reaction can be effected between vinyl acetate and higher molecular weight carboxylic acids in the presence of a catalyst producing a reaction mixture which contains unchanged vinyl acetate, acetic acid, the vinyl ester of the higher molecular weight carboxylic acid and unchanged higher molecular weight carboxylic acid.

Since the vinyl esters are liable to polymerise under the influence of heat, the separation of the several ingredients of the reaction mixture, by distillation, presents the problem of preventing undesirable polymerisation of the vinyl esters whilst, where a mixture of the higher acids is present, e.g. in the case of acids derived from natural oils, there is the further difficulty that the boiling points of the acids are very close to the boiling points of the vinyl esters of the next higher acids so that separation by distillation is virtually impossible on a commercial scale. The actual ester-acid interchange reaction has been the subject of investigation and a mercuric catalyst, such as mercuric sulphate, has been proposed in United States patent specification No. 2,299,862 whilst, in our own copending application Ser. No. 561,984, now U.S. Patent 2,931,819, we have ourselves disclosed an improved catalyst consisting of the mercuric salt of an aromatic sulphonic acid.

We have now found that we can effect a separation of the several substances present in the reaction mixture, without resorting to a distillation step, thus obviating the danger of undesirable polymerisation or decomposition of the vinyl esters which is likely to take place on distillation at an elevated temperature even under reduced pressure.

The present invention, therefore, provides a process for separating a mixture of vinyl esters from a reaction mixture obtained by an ester-acid interchange reaction between a vinyl ester of a low molecular weight aliphatic acid and one or more saturated or unsaturated higher molecular weight mono- or poly-carboxylic acids, containing at least six carbon atoms in the molecule and having only a slight solubility in water, in the presence of a mercuric salt, which comprises neutralising free low molecular weight acid with alkali metal bicarbonate in the cold, recovering the alkali metal salt of said low molecular weight acid from the reaction mixture, thereafter neutralising the residual higher molecular weight carboxylic acid in the cold with an excess of a concentrated solution of an alkali metal carbonate or hydroxide and separating the mixed vinyl esters from the aqueous solution of the alkali metal salt of the higher molecular weight acid. By following the process of the present invention, the free acids present in the reaction mixture are converted to their alkali metal salts which are readily removable from the unchanged vinyl esters and the lower molecular weight vinyl ester can, if desired, be readily stripped from the mixture of vinyl esters by distillation at a temperature sufficiently low, e.g. by vacuum stripping, to avoid any substantial degree of polymerisation of the higher molecular weight vinyl ester.

The reactivity of the higher molecular weight carboxylic acids towards sodium bicarbonate, or other alkali metal bicarbonate, becomes progressively less with increase in molecular weight and, even if the alkali metal bicarbonate is present in the form of a concentrated aqueous solution, the water-solubility of the higher molecular weight carboxylic acid is so slight that the major quantity thereof does not react with the bicarbonate.

We have further found that it is advantageous to effect the preliminary neutralisation with the alkali metal bicarbonate with the aid of a concentrated aqueous solution or slurry of the bicarbonate, the amount of water present in the solution depending on the type of separation used. In one method, the water present is of the order of half the weight of the alkali metal bicarbonate and the separation is of solid alkali metal salt of acetic acid from the liquid ester mix; in the other method, the water present is of the order of three times the weight of the alkali metal bicarbonate and the separation is of aqueous solution of the alkali metal salt of acetic acid and the liquid ester mix. In the former method an approximately 50% excess over and above the stoichiometric amount of alkali metal bicarbonate is required to remove the acetic acid quickly and efficiently but in the latter method appreciably less than the stoichiometric amount is required, particularly if used in a two-stage process, owing to the partition of acetic acid into the aqueous layer.

When carrying out the invention utilising vinyl acetate as the low molecular weight vinyl ester, there is directly recovered the alkali metal salt of acetic acid, e.g. sodium acetate, in a form of satisfactory purity for commerical purposes although, of course, the sodium acetate may be decomposed with strong acid for the recovery of acetic acid as such.

It is desirable for many purposes to ensure complete removal of the mercuric salt from the vinyl esters and this may be effected by reduction, whereby the mercuric salt is decomposed and metallic mercury is precipitated and separated off. One very satisfactory reducing agent is hypo-phosphorous acid, or sodium hypo-phosphite, although satisfactory results may be obtained by the use of sodium hydro-sulphite, which is preferably used at an elevated pH by the addition of an alkali, such as sodium carbonate; it is desirable to use a high pH value for the solution of the reducing agent as thereby the formation of colloidal sulphur when using hydro-sulphite is avoided.

A further particularly convenient method of removal of the mercury is by forming a zinc mercury amalgam by mixing finely divided zinc powder in suspension in water with the vinyl esters; the reaction is rapid and the monomeric vinyl esters separate from the aqueous phase as a clear layer.

The following examples are given to illustrate the manner in which the invention may be carried into effect, in which the percentage figures are quoted as percentages by weight:

*Example 1.—Vinyl ester of distilled coconut oil fatty acids*

The vinyl ester is prepared in a vinyl ester-acid interchange using the mercuric salt of p-toluene sulphonic acid as catalyst, as described in our copending patent application Ser. No. 561,984. At the optimum conversion, approximately 92%, the reaction is stopped and the acetic acid formed in the reaction is neutralised by the addition, with stirring, of a 10% excess of solid sodium bicarbonate followed by the cautious addition of water such that the ratio of sodium bicarbonate to water is 5:2 by weight. The acetic acid content after four hours' stirring at room temperature should be less than 1%. At such a ratio of bicarbonate to water the mix separates into two layers, monomer and solid, from which the monomer can be separated by decantation, or the whole mix, as a slurry, may be passed into a basket centrifuge. The residual higher fatty acids are then neutralised by 10% sodium carbonate solution using a 10% excess and keeping the temperature as low as possible (less than 20° C.) in order to avoid undue hydrolysis. After twenty minutes, the acidity should be less than ½%. The mix is separated, the aqueous layer being acidified for recovery of the higher fatty acids. The mercury derived from the catalyst is now removed from the monomer and recovered as follows. Zinc powder, in a molar ratio of from 2.3 to 2.5:1 on the theoretical mercury content, is then added with stirring and, after two hours, a sample is removed, centrifuged, and the clear monomer tested for mercury by the addition of hypo-phosphorous acid. If mercury free, the Zn/Hg amalgam is allowed to settle and is run off. It may be found advantageous to add a little acetic acid to facilitate the recovery of the mercury. The vinyl acetate contained in the monomer may then be stripped off under vacuum from the monomer layer if desired.

*Example 2.—Vinyl ester of distilled coconut oil fatty acids*

This example illustrates the use of mercuric sulphate as the catalyst following the disclosure of United States patent specification No. 2,299,862. The general procedure is substantially identical with that described in Example 1 but the amount of sodium carbonate solution required is greater since the conversion utilising mercuric sulphate is only about 60% as compared with the 92% conversion obtained in accordance with Example 1.

*Example 3.—Vinyl ester of distilled coconut oil fatty acids*

The vinyl ester is prepared in a vinyl ester-acid interchange using the mercuric salt of p-toluene sulphonic acid as catalyst. The general procedure is substantially identical with that described in Example 1 except for the neutralisation of acetic acid by sodium bicarbonate.

In this example half the stoichiometric amount of sodium bicarbonate was added together with three times the weight of water. The acetic acid content after stirring for a few minutes was far less than half the initial amount. The aqueous solution of sodium acetate and acetic acid was separated off and the remainder of the acetic acid neutralised by the stoichiometric amount of sodium bicarbonate together with three times its weight of water. The mix was stirred for about 20 minutes after which time the acetic acid content was less than 1%. The two portions of aqueous solution of sodium acetate and acetic acid were combined for recovery of acetic acid.

The neutralisation of the unconverted long-chain acid and removal of the mercury catalyst were as outlined in Example 1.

*Example 4.—Vinyl behenate*

Vinyl behenate was prepared by following the procedure set out in Example 1, except for substituting behenic acid for the coconut oil fatty acids; in order to keep the reaction mixture liquid, the filtration step was carried out at a temperature between 30° and 40° C.

*Example 5.—Divinyl adipate*

Divinyl adipate was prepared by the procedure described in Example 1 substituting adipic acid for the coconut oil fatty acids. Since adipic acid is soluble to the extent of about 1.5% in water at 15° C., a proportion of the adipic acid is neutralised in the first neutralisation stage employing sodium bicarbonate, the majority of the adipic acid, however, being removed in the second neutralization stage employing sodium carbonate.

*Example 6.—Vinyl sebacate*

Vinyl sebacate was prepared following the procedure disclosed in Example 1, substituting sebacic acid for the coconut oil fatty acids.

Although, in the foregoing examples, the removal of the mercury catalyst is shown as being effected by zinc powder, other methods may be used, as previously mentioned, effecting the removal of the catalyst just prior to the second neutralisation step.

It is also advantageous to use an excess of the initial lower vinyl ester as this facilitates handling of the reaction mixture by acting as a solvent and diluent for the less mobile high molecular weight acids and esters.

It will be appreciated that the process of the present invention provides a predominantly chemical method for separating the acids and esters from the ester-acid interchange reaction, as distinct from the purely physical method described in our copending patent application Ser. No. 561,984, now U.S. Patent 2,931,819.

The mixed vinyl esters may be employed for the direct production of a copolymeric product or, if the higher vinyl ester is required in pure form, the lower molecular weight unreacted vinyl ester may be stripped by vacuum distillation.

The invention provides a process which can be carried out in a simple apparatus and an overall time for treatment of the reaction mixture is less than a straightforward distillation process. Moreover, the losses of material are appreciably lower, generally speaking being less than 5% by weight overall, the majority of the loss being in the form of the lower vinyl ester, e.g. vinyl acetate, which may be regarded as being a solvent for the higher molecular weight vinyl ester which is being prepared.

In our co-pending patent application Ser. No. 561,984, now U.S. Patent 2,931,819, we have described the stopping of the ester-acid interchange reaction at an optimum conversion figure (with a view to minimizing the production of undesired by-products), by the addition of an alkali metal salt, such as sodium acetate, and it will be understood that, in operating in accordance with the present invention, the stopping of the ester-acid interchange reaction can be effected as an integral part of the first neutralisation stage since, of course, the neutralisation of the free acetic acid, or other low molecular weight aliphatic acid, produces the alkali metal salt which is effective to stop the interchange reaction.

We claim:

1. In a process for the preparation of vinyl esters by an ester-acid interchange reaction between a vinyl ester of a low molecular weight aliphatic acid and a higher molecular weight acid, containing at least one carboxyl group and having at least six carbon atoms in the molecule and having only a slight solubility in water, in the presence of a mercuric salt, the steps of separately recovering the high and low molecular weight acids from the mixed vinyl esters with avoidance of a distillation step comprising first selectively neutralising free low molecular weight acid with alkali metal bicarbonate in the cold and gravitationally separating the alkali metal salt of said low molecular weight acid from the reaction mixture, thereafter neutralising the residual higher molecular weight carboxylic acid in the cold with an excess of a concentrated solution of a strongly basic alkali metal compound of the class consisting of the alkali metal carbonates and hydroxides, gravitationally separating the mixed vinyl esters from the aqueous solution of the alkali metal salt of the higher molecular weight acid; and separating the mercuric catalyst from the liquid mixture by chemical reduction to metallic mercury.

2. A process according to claim 1 wherein the alkali metal bicarbonate is employed in the form of a concentrated aqueous solution.

3. A process according to claim 1 wherein the alkali metal bicarbonate is employed in the form of a slurry.

4. A process according to claim 3 wherein the alkali metal bicarbonate is employed together with about half its weight of water and the solid alkali metal salt of the low molecular weight acid is gravitationally separated from the liquid ester mix containing the higher molecular weight acid.

5. A process according to claim 2 wherein the alkali metal bicarbonate is employed in the form of its solution in about three times its weight of water and the resulting aqueous solution of the salt of the low molecular weight acid is separated off.

6. A process according to claim 4 wherein the treatment with said bicarbonate solution is effected in a plurality of stages.

7. A process according to claim 1 wherein said reduction of the mercuric catalyst is effected by adding hypophosphorous acid to the liquid mixture.

8. A process according to claim 1 wherein the mercuric catalyst is separated from the liquid mixture by the addition of finely divided zinc powder in aqueous suspension and the resultant zinc-mercury amalgam suspension is separated from the liquid ester mixture.

9. A process according to claim 8 wherein the zinc is employed in a molar ratio with respect to the theoretical mercury content of from 2.3 to 2.5:1.

10. A process according to claim 1 wherein the lower molecular weight vinyl ester is removed from the higher molecular weight vinyl ester by distillation under reduced pressure.

References Cited in the file of this patent

UNITED STATES PATENTS

| | | |
|---|---|---|
| 2,299,862 | Toussaint et al. | Oct. 27, 1942 |
| 2,440,238 | Alley et al. | Apr. 27, 1948 |
| 2,586,860 | Port et al. | Feb. 26, 1952 |
| 2,646,437 | Dickey et al. | July 21, 1953 |

FOREIGN PATENTS

| | | |
|---|---|---|
| 686,050 | Great Britain | Jan. 14, 1953 |

OTHER REFERENCES

Blout et al.: "Monomers," chapter entitled "Vinyl Acetate," page 14, copyright 1949 by Interscience Publishers Inc.

Bailey: "Industrial Oil and Fat Products," 2d edition, Interscience Publishers, Inc., New York, 1951, pp. 813 and 814.